Feb. 13, 1934.  E. CREWDSON  1,947,334
ROTARY FLUID PRESSURE ENGINE
Filed Feb. 19, 1932  3 Sheets-Sheet 1

INVENTOR
Eric Crewdson,
BY
ATTORNEYS.

Feb. 13, 1934.    E. CREWDSON    1,947,334
ROTARY FLUID PRESSURE ENGINE
Filed Feb. 19, 1932    3 Sheets-Sheet 3
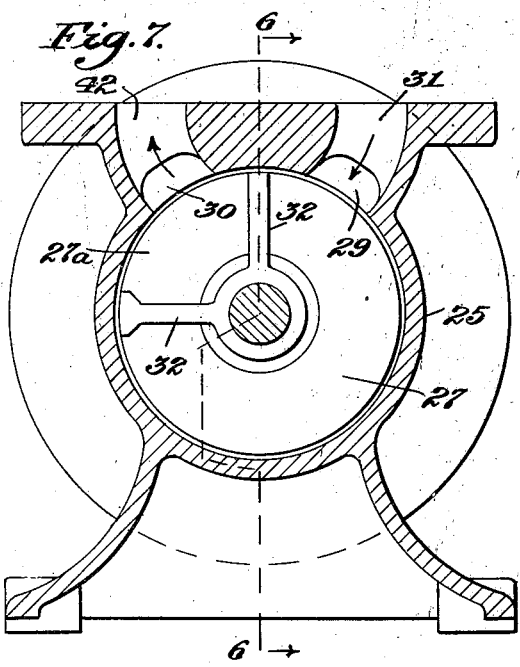
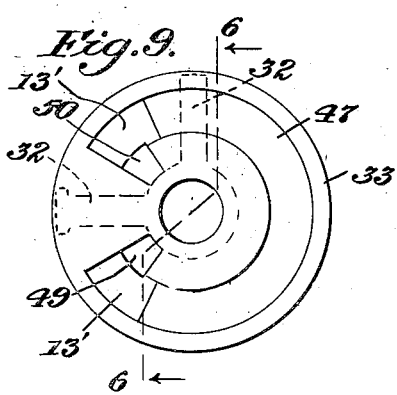
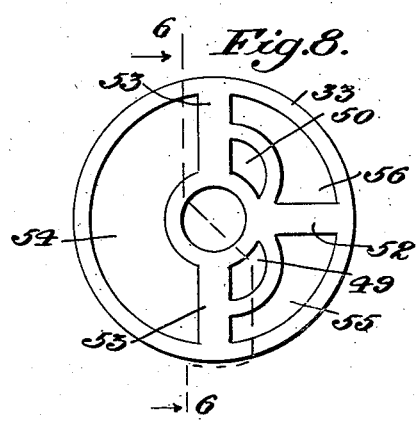
Inventor:
Eric Crewdson, Patented Feb. 13, 1934

1,947,334

UNITED STATES PATENT OFFICE 1,947,334

ROTARY FLUID-PRESSURE ENGINE

Eric Crewdson, Kendal, England, assignor of one-half to Gilbert Gilkes and Gordon Limited, Kendal, England, a British Company Application February 19, 1932, Serial No. 594,126, and in Great Britain February 27, 1931

8 Claims. (Cl. 103—96)

The present invention relates to pumps.

The object of the present invention is to provide a rotary self priming pump by providing a pocket, adapted to retain water therein when the pump is stopped, in between the suction pipe and the suction port in the pump. The suction and delivery ports are placed nearer the center of the pump than the mean diameter of an entraining channel which is swept over by a runner positioned adjacent thereto so that air drawn from the suction pipe on starting and forced to the center of the runner by the water therein acted on by centrifugal force, can escape through the delivery port.

The rotor is preferably provided with vanes and pockets opposite the channel to assist in entraining the fluid.

The invention is more particularly described with reference to the accompanying drawings in which two forms of construction are shown by way of example and in which:—

Figure 7 is a section on the line 7—7 of Figure 6.

Figure 8 is a detail of the construction illustrated in Figures 6 and 7, showing the face of a diaphragm at the side opposite the runner.

Figure 9 is a view of the face of a diaphragm at the side adjacent the runner, i. e. along line 9—9 of Fig. 6.

Figure 1:
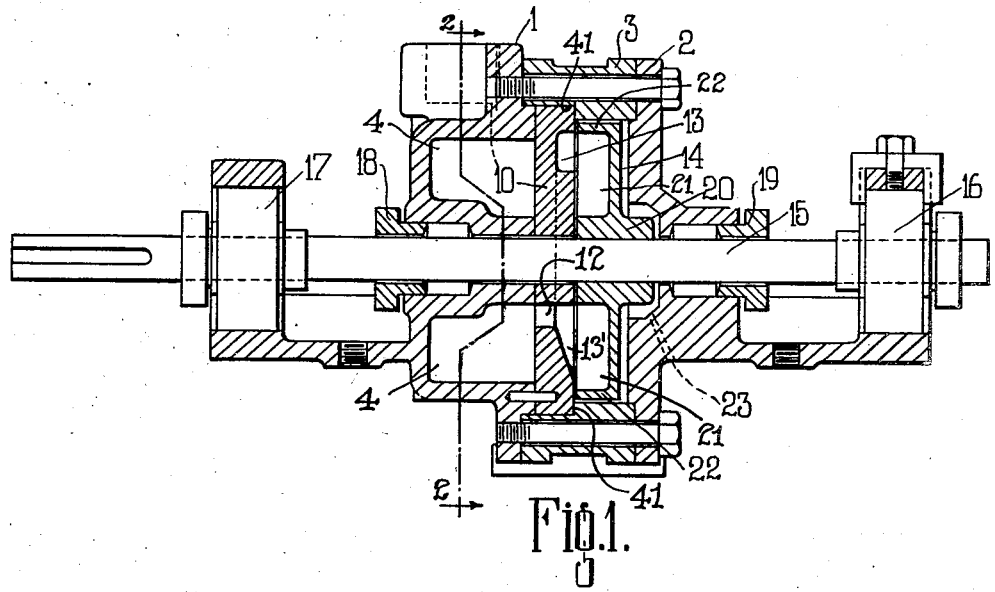
Figure 1 is a longitudinal sectional elevation on the line 1—1 of Figure 2 showing a pump having a single sided runner.
Figure 2:
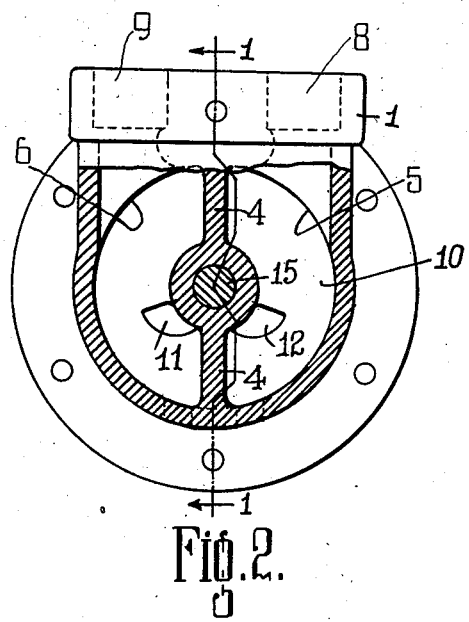
Figure 2 is a transverse section substantially on line 2—2 of Figure 1.

The pump consists of a casing 1 (Figure 1) and a cover 2 which are spaced apart by a distance piece 3. The casing 1 is divided by a rib 4 to form two priming pockets 5 and 6 (Figure 2) which are provided with screw threaded openings 8 and 9 for the reception of suction and delivery pipes respectively. One wall of the priming pockets 5 and 6 is formed by a ported diaphragm 10 which is nipped between a recess 41 of the distance piece 3 and the casing 1.

Two ports 11 and 12 (Figure 3) are provided in the diaphragm 10 which communicate with the pockets 5 and 6 and with a concentric groove 13 extending over substantially 240° of arc in the diaphragm.

A runner 14 is securely shrunk onto a shaft 15 which is carried in bearings 16, 17 housed in extensions of the casing 1 and of the cover 2. The shaft 15 passes through the casing 1 and cover 2 through glands 18 and 19.

Figure 4:
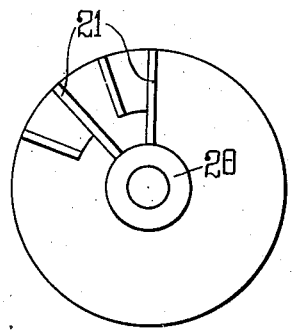
Figure 6:
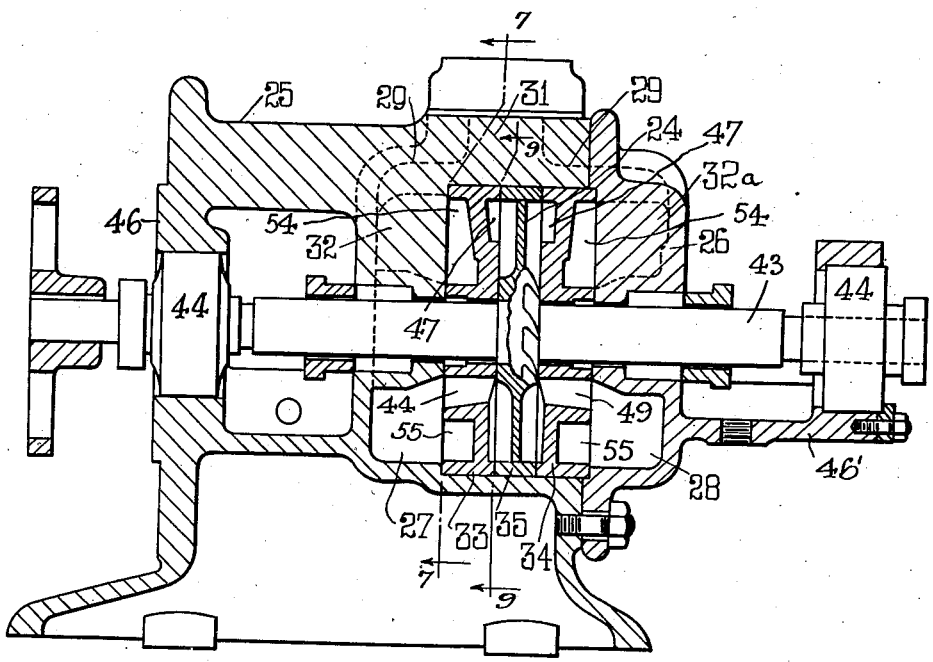
Figure 6 is a longitudinal sectional elevation of a second form of construction employing a double sided runner substantially on the section lines 6—6 of Figures 7, 8 and 9.

The runner 14 consists of a boss 20 having a disc radiating therefrom which is provided on one side with radial vanes 21 (Figures 4 and 5) which are set at an angle of approximately 45° to the plane of the runner in the direction of rotation. For convenience in manufacture the vanes may be made alternately long and short as shown in Figure 4 but need not be so made for successful operation. The ends of the veins are shrouded by a ring 22.

Figure 5:
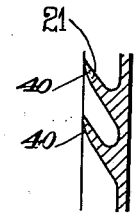
Figures 4 and 5 are details of the runner vanes.

It has been found that the head which the pump will develop is increased if the back or trailing edges of the vanes are rounded off as shown at 40 in Figure 5.

The runner is hydraulically balanced by means of a leakage hole 23 in the cover 2. There is a tendency for the runner 14 to be drawn towards the diaphragm 10 so that it is pulled up if no balancing means or thrust block is provided. If the rear side of the runner is closed the pressure builds up on that side and the runner takes up a position in which there is no leakage past the rim. However the hole 23 permits leakage from the back of the runner and the runner takes up a position such that the leakage past the edge is equal to the leakage from the hole 23. This method of balancing is known, per se. The hole 23 is of such diameter as to allow the runner 14 to take up a position some thousandths of an inch from the diaphragm 10.

The distance between the inside edges of the ports must be greater than the distance between two long vanes otherwise in certain positions of the rotor there will be a passage from the exhaust 12 to the suction port 11 in the direction of rotation and fluid will escape by that path.

The pump is self-priming and the suction port 11 and the discharge port 12 must be arranged as near to the center of the pump as is possible and some part of the delivery port 12 should be nearer the center of the pump than the outer edge of the boss 20 to allow the escape of air in the center of the runner.

It has been found that the efficiency and self-priming property of the pump are improved if the channel 13 is gradually shallowed at 13' radially opposite the discharge port 12, which is nearer the center of the pump than the mean diameter of the channel, to slope evenly towards the face of the diaphragm 10 and towards the port 12. The effect due to the shallowing of the channel opposite the discharge port 12 is balanced by correspondingly shallowing of the channel 13 opposite the suction port 11.

The operation of the pump is as follows:—
Assuming the pump at a standstill and the suction pipe empty the pockets 5 and 6 will contain water. When the pump is started up the runner 10 carries round a quantity of water between the blades 21 which is thrown to the periphery of the pump by centrifugal action. The water at the periphery of the pump cannot escape since the ports are near the center. As each successive pocket between blades 21 passes the suction port 11, it takes in air; and as it passes the delivery port 12, the air near the center of the pump escapes through the port. As the pocket moves opposite the plain portion of the diaphragm where there is no channel and the volume between the pocket and diaphragm is less, the water completely fills the pocket. The water in the pocket on passing the suction port 11 again draws air from the suction pipe and delivers it out of the delivery port 12. The process continues until all the air in the suction pipe is exhausted and the pump delivers water.

The single sided runner construction described has a disadvantage in that effective hydraulic balance is difficult to obtain owing to unequal pressure on the runner near the suction and delivery ports and a very rigid runner shaft must be employed for ideal working.

A preferred form of construction is shown in Figures 6, 7, 8 and 9 which illustrate a pump having a double sided runner 24 with blades 21 on both faces.

The runner shaft 43 is mounted in bearings 44 and 45 housed in an extension 46 of the casing 25 and an extension 46' of a cover 26. The runner is assembled in the casing between a pair of diaphragms 33, 34 which are spaced apart by a distance piece 35 and are nipped thereby against the casing 25 and the cover 26. Each of the diaphragms 33, 34 has cut therein an arcuate channel 47, which extends (Fig. 9) arcuately about the center of the diaphragm and terminates in suction and delivery ports 49, 50 (Figure 8) passing through the diaphragm, which is nearer the center thereof than the mean diameter of the channel 47.

Figure 3:
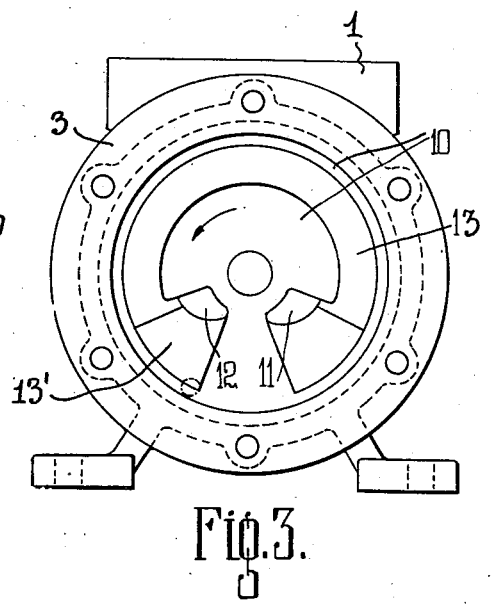
Figure 3 is an end elevation with the end cover and runner removed to show the ported diaphragm.

The channel 47 is shallowed at each end in the region of ports 49, 50 as illustrated at 13' in the construction shown in Figure 3.

The rear of each diaphragm 33, 34 is provided with two ribs 52, 53 at right angles which divide the rear into three compartments 54, 55 and 56. The ribs 52 and 53 engage two ribs 32 at right angles formed in the hollow of the casing 25 so as to divide the space at the back of the diaphragm into two pockets 27 and 27a which are in communication respectively with a horizontal suction passage 29 and a horizontal delivery passage 30 formed in the casing. The casing cover 26 is provided with similar ribs 32a to those in the casing 25 so that similar but symmetrical pockets 27 and 28 are provided therein in communication with the suction and delivery passages 29 and 30.

The horizontal passages 29 and 30 are in connection with vertical suction and delivery passages 31, 42 in the casing 25.

The suction pockets 27 at the rear of the diaphragms occupies 270 degrees of arc and the delivery pockets 60-90 degrees of arc.

The operation of the double sided runner pump is similar to that of the single sided runner but in the case of the double sided runner the forces on each side of the runner balance each other and no other balancing means need be employed.

I claim:

1. A pump comprising a casing having suction and delivery passages therein, a diaphragm having a fluid entraining channel therein, and a pair of ports communicating with the ends of said channel and positioned nearer the center of the pump than the mean diameter of said channel, an imperforate rotor mounted in said casing, vanes rounded on their trailing edges on said rotor and inclined in the direction of rotation of said rotor to entrain fluid along said channel, and a priming pocket to retain liquid when the pump is stopped and located between said suction passage and the suction port on said diaphragm.

2. A pump comprising a casing having suction and delivery passages therein, a diaphragm having a fluid entraining channel therein, and a pair of ports communicating with the ends of said channel and positioned nearer the center of the pump than the mean diameter of said channel, and an imperforate rotor mounted in said casing adjacent said channel and including vanes rounded on their trailing edges and inclined in the direction of rotation of said rotor to entrain fluid along said channel.

3. A pump comprising a casing having suction and delivery passages therein, a pair of diaphragms each having a fluid entraining channel therein, and pairs of ports each pair communicating with the ends of a corresponding said channel and positioned nearer the center of the pump than the mean diameter of said channel, a rotor shaft mounted in said casing, an imperforate disc on said rotor shaft between said channels, and vanes rounded on their trailing edges on opposite sides of said disc and inclined in the direction of rotation of said rotor to entrain fluid along said channels.

4. A pump comprising a casing having suction and delivery passages therein, a diaphragm having suction and delivery ports therein connected by an arcuate channel externally for less than 360° of arc and shallowed radially in the region of said ports, and of greater mean diameter than the distance of said ports from the center of the pump, an imperforate rotor mounted in said casing adjacent said channel and including vanes rounded on their trailing edges and inclined in the direction of rotation of said rotor to entrain fluid along said channel, and a priming pocket to retain liquid when the pump is stopped and located between said suction passage and the suction port on said diaphragm.

5. A pump comprising a casing having suction and delivery passages and axially spaced cavities therein, a pair of diaphragms each forming a closing wall for one of said cavities and having suction and delivery ports therein connected by arcuate channels extending for less than 360° of arc, a rotor shaft, an imperforate disc on said rotor shaft positioned between said diaphragms in said casing, vanes rounded on their trailing edges and located on opposite sides of said disc for sweeping the open side of said channels, and ribs in said casing engaging said diaphragms to divide said cavities into suction and delivery priming pockets in communication with said suction and delivery ports and said suction and delivery passages.

6. A pump comprising a casing having suction and delivery passages therein, a pair of diaphragms having suction and delivery ports therein connected by arcuate channels extending for less than 360° of arc, a rotor shaft, an imperforate disc on said shaft positioned between said diaphragms in said casing, vanes rounded on their trailing edges and located on opposite sides of said disc for sweeping the open side of said channels, an end cover for said casing, radial ribs at right angles in said cover and said casing and ribs at the rear of said diaphragms engaging said ribs in the cover and casing to form two suction priming pockets at the rear of said diaphragms extending over approximately 270° of arc in communication with said suction ports and said suction passage and two delivery priming pockets extending over approximately 90° of arc and communicating with said delivery ports and said delivery passage.

7. A rotary pump comprising a casing having suction and delivery passages therein, a rotor shaft, a diaphragm concentric with the shaft having a fluid-containing channel extending peripherally therein and a pair of ports which establish communication between the ends of said channel and said passages and are positioned nearer the axis of the pump than the mean diameter of said channel, and a rotor mounted on said shaft in the casing and having an imperforate wall adjacent said channel and having vanes extending from said wall toward the diaphragm and inclined in the direction of rotation of said rotor for entraining fluid along said channel, said vanes having the back or trailing edges rounded.

8. A rotary pump comprising a casing having suction and delivery passages and axially spaced cavities therein, a rotor shaft extending through said cavities, a rotor mounted in said casing and having vanes inclined in the direction of rotation of said rotor, said vanes having the back or trailing edges rounded, a pair of diaphragms each located around said shaft adjacent a corresponding face of said rotor and providing a wall between the corresponding cavity and the rotor and each having a fluid-containing channel extending peripherally therein adjacent the corresponding face of said rotor for cooperation with the vanes thereon, and ribs in said casing extending from said shaft and dividing each cavity into suction and delivery priming pockets, each diaphragm having suction and delivery ports therethrough which are located nearer the axis of said shaft than the mean diameter of the corresponding channel for establishing individual communication between the said pockets and the ends of said channels.

ERIC CREWDSON.